United States Patent [19]

Marcellin-Dibon et al.

[11] Patent Number: 5,790,305
[45] Date of Patent: Aug. 4, 1998

[54] PROJECTION SYSTEM COMPRISING A FREE FORM REFLECTOR AND A FREE FORM LENS

[75] Inventors: Eric Marcellin-Dibon, Strasbourg; Friedheim Wielhege, Illkirch, both of France

[73] Assignee: Thomson multimedia S.A., Courbevoie, France

[21] Appl. No.: 622,985

[22] Filed: Mar. 27, 1996

[30] Foreign Application Priority Data

Apr. 13, 1995 [FR] France ................. 95 04477

[51] Int. Cl.$^6$ .................. G02B 17/00; G02B 3/00; G02B 5/10; G02F 1/1335
[52] U.S. Cl. ............... 359/364; 359/649; 359/709; 359/712; 359/728; 359/853; 359/868; 359/869; 359/49
[58] Field of Search ............ 359/728, 622, 359/853, 868, 869, 709, 712, 449, 457, 364, 49, 70, 649

[56] References Cited

U.S. PATENT DOCUMENTS

| | | | |
|---|---|---|---|
| 4,136,926 | 1/1979 | Sigler | 359/858 |
| 4,234,247 | 11/1980 | Dorman | 359/359 |
| 4,733,955 | 3/1988 | Cook | 359/859 |
| 5,098,184 | 3/1992 | Van Den Brandt et al. | 359/622 |
| 5,222,025 | 6/1993 | Taylor, II | 359/851 |
| 5,331,470 | 7/1994 | Cook | 359/859 |
| 5,640,283 | 6/1997 | Warren | 359/859 |

FOREIGN PATENT DOCUMENTS

| | | |
|---|---|---|
| 0266244 | 5/1988 | European Pat. Off. . |
| 2040431 | 8/1980 | United Kingdom . |

OTHER PUBLICATIONS

Bass, Michael, Editor in Chief, Handbook of Optics: Fundamentals, Techniques, & Designs, Second Edition, vol. I, McGraw–Hill, Inc., New York, pp. 1.35–1.39, 1995.

Applied Optics, vol. 31, No. 28, Oct. 1, 1992, New York, USA pp. 6027–6035, J.M. Gordon, et al. "Non–Imaging Reflectors for Efficient Uniform Illumination" p. 6027, figure 1.

*Primary Examiner*—Georgia Y. Epps
*Assistant Examiner*—Evelyn A. Lester
*Attorney, Agent, or Firm*—Joseph S. Tripoli; Frederick A. Wein

[57] ABSTRACT

The disclosure relates to an LCD projector illumination system that optimizes the illumination through a liquid crystal screen as well as through the aperture of the system's objective, wherein the shape $Zr,\beta$ of the reflector is described by a set of elementary surfaces dS each of which is associated with a function $Z(\rho)$, corresponding to a median plane $(r,\beta)$ to be illuminated, defined by the distance r between the center and the edges of said screen and the angle $\beta$ between the horizontal plane and this median plane, the inclination of each elementary surface dS being computed by interpolating said functions $Z(\rho)$ with a function $Z(x,y)$.

15 Claims, 3 Drawing Sheets

PROJECTION SYSTEM COMPRISING A FREE FORM REFLECTOR AND A FREE FORM LENS

BACKGROUND OF THE INVENTION

The invention relates to a system for illumination of a liquid crystal display (LCD) projector that optimizes the lighting through the liquid crystal screen and also the aperture of the objective of the system.

DESCRIPTION OF THE PRIOR ART

A system of projection through an LCD generally comprises an arc lamp of metallic halogen filament type or xenon type, positioned at the focal point of a parabolic or elliptical reflector equipped with a condenser. The white light emitted by the lamp and reflected by the reflector passes through a field lens towards a liquid crystal screen (or electo-optic modulator) that functions as an optical valve. In general, these modulators have an active matrix structure controlled by thin film transistors (TFT). The images transmitted through the LCD are then projected onto a screen by an objective. To obtain colored images three liquid crystal screens are combined, positioned on the blue, green and red optical paths, or alternatively only one liquid crystal screen with color filters is used. Such a system is described in detail in the U.S. Pat. No. 5,084,807 by T.S. McKechnie et al.

At present, this type of projector has a low optical yield, typically only 1% to 2%. This is mainly due to losses in the reflector, to the fact that the light source is not polarized (leading to more than 70% loss of the optical flux), to the format of liquid crystal screens that are rectangular (about 46% loss) and the poor efficiency of the cutting of the white spectrum of the lamp (about 50% to 60% loss).

FIG. 1 illustrates the problem of dispersion of the light around the modulator. We observe that in the case of a parabolic reflector 1 (hatched lines in the figure), the light rays 2 emitted by the arc lamp 3 (hatched lines) illuminate the external areas of the screen 4. These geometric losses represent more than 50% of the luminosity of the system. Furthermore, the use of a spherical field lens forms an enlarged image of the source and therefore requires a very open projection objective, because the rays incident on the spherical field lens are not parallel over the whole lens, so the image of the source is large and implies a large aperture in the projection objective.

SUMMARY OF THE INVENTION

This invention allows the inconveniences of these known solutions to be eliminated and to greatly increase the efficiency of screen illumination owing to the judicious forms of reflectors, field lenses and angle correction lenses. These lenses allow the quality of illumination to be greatly improved on the final projection screen by minimizing the losses of light between the lamp and this screen.

This invention relates to a reflector illuminating a surface and which is particularly well adapted for use in a system of projection through a liquid crystal screen, comprising a lamp and a reflector reflecting the light from the lamp toward a surface, such as a liquid crystal screen, is characterized in that its shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface and the angle $\beta$ between the horizontal plane and this median plane. The inclination of each elementary surface dS is computed by interpolating said functions $Z(\rho)$ with a function $Z(x,y)$.

This enables rectangular illumination which can perfectly cover the surface of a liquid crystal screen of a projection system such as that represented in FIG. 1 by solid lines from the reflector, according to the invention.

Preferably, each of said functions $Z(\rho)$ is a conical equation added to a polynomial, or a pure polynomial. Likewise, the interpolation function $Z(x,y)$ can be a polynomial, or a conical polynomial added to a polynomial, or a "Spline" function.

The distance r and the angle $\beta$ can define a rectangular surface, such as a screen, for example, or a substantially circular area, for example, to be centered at the center of a screen, the average diameter lying between the major and minor dimensions of the rectangular screen.

The reflector is preferably divided into several sections each defined by a radius relative to the optical axis. The continuous form of the reflector is obtained by interpolation with a function $Z(x,y)$ of various functions $Z(\rho)$ each associated with one of the sections.

A second example of application of this invention concerns a field lens characterized in that its shape $Z\beta$, Po is described by a set of elementary surfaces dS each of which is associated with a function $Z(\rho)$, each corresponding to a point Po to be illuminated from the optical axis (oz) and to the angle $\beta$ between the horizontal and the median plane passing by Po. The inclination of each of these elementary surfaces dS is obtained by interpolating these functions $Z(\rho)$ with a function $Z(x,y)$. Thus, this enables the mean incident ray to be focused at the center of the objective and thus optimize the aperture of the objective, i.e. to reduce the opening of the pupil.

A third embodiment of this invention concerns an angle correction lens characterized in that its shape $Z\beta,\infty$ is described by a set of elementary surfaces dS, each associated with a function $Z(\rho)$ corresponding to a point P to be illuminated describing the surface of the lens at a distance d from the lens, and the angle $\beta$ between the horizontal and the median plane passing through each of the points P, the inclination of all of these elementary surfaces dS being obtained by interpolating these functions $Z(\rho)$ with a function $Z(x,y)$.

A fourth embodiment of this invention relates to a "free form" lens illuminated by any reflector, characterized in that the shape $Zr,\beta$ of this lens is described by a set of elementary surfaces dS each of which is associated with a function $Z(\rho)$, each corresponding to a median plane $(r,\beta)$ to be illuminated, defined by the distance r between the center and edges of this screen and the angle $\beta$ between this median plane and the horizontal, the inclination of each of these elementary surfaces dS being obtained by interpolating these functions $Z(\rho)$ with a function $Z(x,y)$.

This invention also relates to a device which focuses the light through a liquid crystal screen, characterized in that it comprises an angle correction lens, according to this invention, illuminating by horizontal beams a perpendicular network of microlenses Li, each of which is focused at the center of a pixel Pi of the screen.

Each of these optical devices improves the illumination efficiency. This patent application also covers the projection systems using all types of combinations of these various components.

BRIEF DESCRIPTION OF THE DRAWINGS

The invention will be better understood and other advantages will become clear on reading the following description making reference to the appended figures, of which.

DESCRIPTION OF THE PREFERRED EMBODIMENT(S)

Figure 2A:
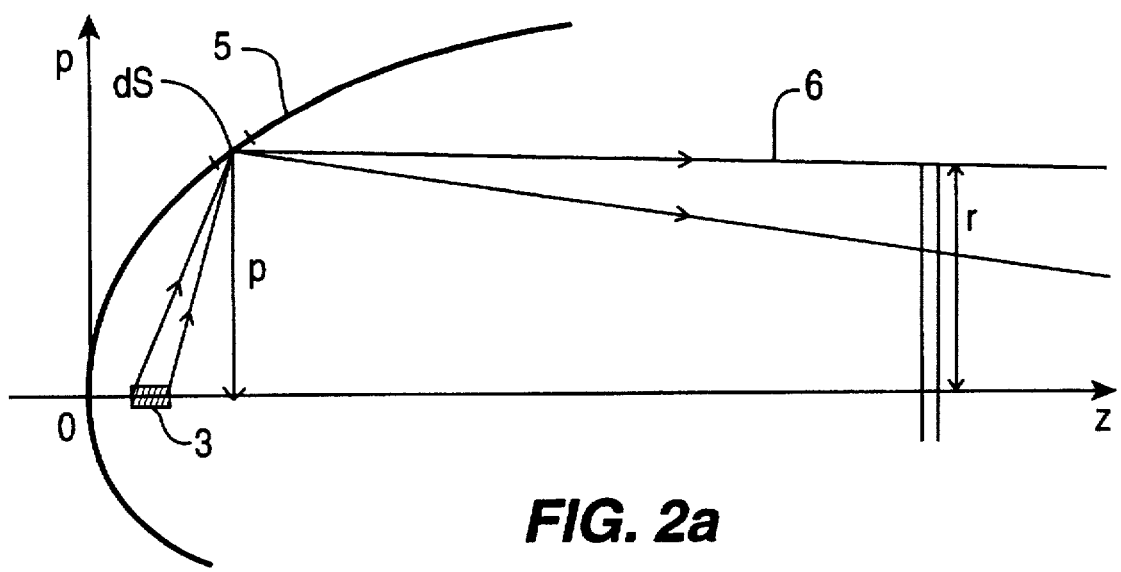
FIGS. 2a, 2b and 2c illustrate a first application of this invention to a free form reflector.

The free form of reflector 5, according to the invention, is obtained by defining system parameters as represented in FIG. 2a. The inclination of each elementary surface dS of reflector 5 is calculated so that the extreme rays from the lamp enter the diaphragm of radius r. The shape $Zr,\beta$ (p) of reflector 5 is described by a set of functions $Z(\rho)$, each given by a median plane $(r,\beta)$ to be illuminated. Each median plane is defined by the distance r between the center and the edges of the valve, and the angle $\beta$ between this plane and the horizontal, i.e. the intersection of these planes is the optical axis (oz). These functions can have multiple forms such as that of a conical section added to a polynomial, or pure polynomial, for example. In the example illustrating this invention, the following function is considered:

$$Z(r) = \frac{c \cdot p^2}{1 + \sqrt{1-(1+\epsilon)c^2p^2}} + a_2\rho^2 + a_4\rho^4 + a_6\rho^6 + \ldots + a_n\rho^n \quad (1)$$

where $\epsilon$ is the conic coefficient of the general conic equation that defines the shape of the conic with:

The first term on the right is the equation of a revolution conical section around the optical axis (oz) to which a polynomial of order n is added representing the deformation of the conical section. The inclination of each elementary surface dS of reflector 5 is calculated so that the external ray 6 coming from lamp 3 enters the diaphragm.

Figure 2B:
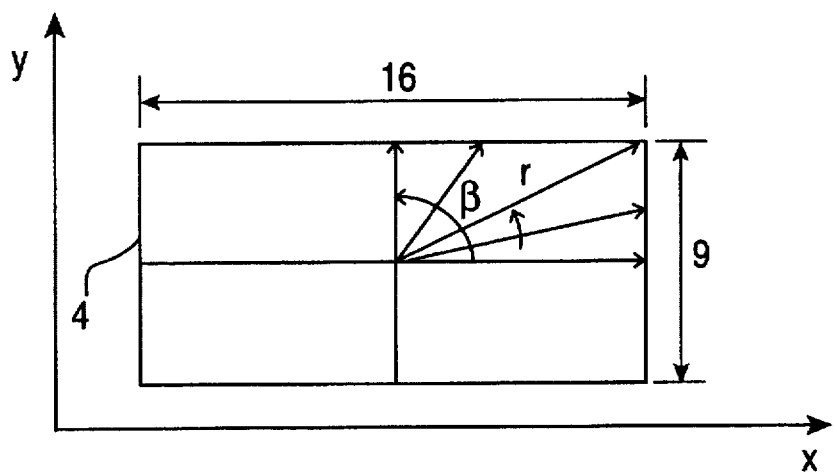

Theoretically, by performing this optimization for a large number of planes $(r,\beta)$, a free form reflector is obtained. Indeed, each median plane is characterized by an angle $\beta$, and a radius r corresponds to it, where r describes the border of the optical valve, a 16/9 format LCD screen in the case of FIG. 2b. Each of the preceding polynomials can be calculated from equation (1) for each median plane $(r,\beta)$.

In order to obtain the optimized shape of the reflector according to the invention, it is necessary to interpolate all the preceding polynomials using, for example, the following polynomial in (x, y):

$$Z(x, y) = \frac{c \cdot \rho^2}{1 + \sqrt{1-(1+\epsilon)c^2 \rho^2}} + \sum_{i=1}^{n} \sum_{j=0}^{i} b_{ij}x^{i-j}y^j, \quad (2)$$

where C is the radius of curvature of the outgoing conical section and $\epsilon$ is the ellipticity of conical section.

For n=4, for example, we obtain:

$$Z(\rho, \beta) = \frac{\rho^2}{4 \cdot f} + \sum_{i=1}^{4} \sum_{j=0}^{i} b_{ij}x^{i-j}y^j \quad (3)$$

$$= \frac{\rho^2}{4 \cdot f} + b_{10}x + b_{11}y + b_{20}x^2 + b_{21}xy + b_{22}y^2 +$$

$$b_{30}x^3 + b_{31}x^2y + b_{32}xy^2 + b_{33}y^3 +$$

$$b_{40}x^4 + b_{41}x^3y + b_{42}x^2y^2 + b_{43}xy^3 + b_{44}y^4$$

Thus, for n=4, there are 14 coefficients to calculate. This is carried out in a known manner by a two-dimensional polynomial interpolation from the set of data generated by equation (1) and by inverting the coefficients of equation (2). In this way, the equation of a reflector 5 is obtained delivering an illumination resembling the format of the LCD screen 4. The illumination through the latter is thus optimized.

An embodiment of the invention can be made using the following parameters:

| | |
|---|---|
| paraboloid: | focal length: 11 mm, |
| | radius: 50 mm, |
| lamp: | arc length: 5.0 mm, |
| | arc diameter: 1.5 mm, |
| | 16/9 format LCD size: 2.2"/48.7 × 27.4 mm$^2$, |
| | illumination plane - source distance: 20 mm, |
| | field lens - LCD screen distance: 20 mm, |
| | field lens - pupil entrance distance: 150 mm. |

Owing to the distance between the LCD screen and the field lens, the illumination plane must be larger than the LCD screen, 56.2×36.6 mm$^2$ in this case.

The free form reflector thus defined, illuminates the field lens in a rectangular manner. The incidents rays impinge on the lens at various angles.

Instead of using the rectangular form of the liquid crystal screen to define the shape of the reflector, as described above, a curve can be used to better distribute the flux and thus improve the efficiency and uniformity of the projection system's illumination. This curve can have a substantially circular form and can be described by the distance r and the angle $\beta$. Indeed, in the small dimensions of the liquid crystal screen, the angles induced by the reflector are often much too large and lead to nonuniform illumination. It may therefore be preferable to calculate the shape of the reflector as previously described, but, in order to improve flux, from a substantially circular surface whose mean diameter preferably between the screen's major and minor dimensions.

Figure 2C:
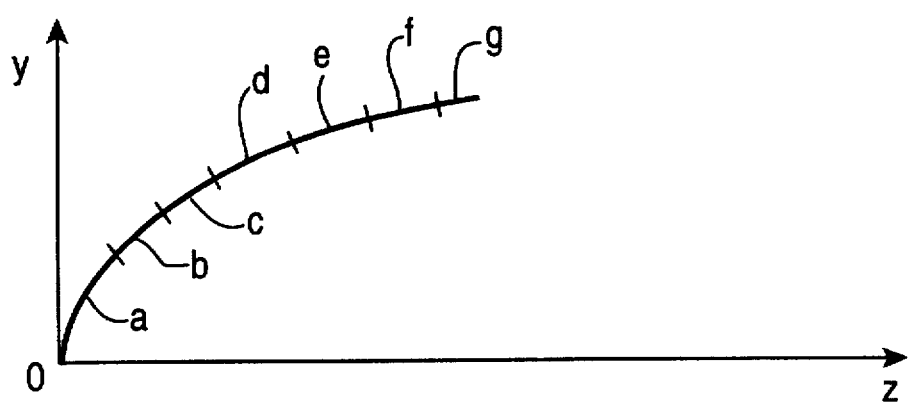

Another variant to improve the illumination consists in dividing the reflector into several sections a, b, c, d, e, f and g, as shown in the embodiment in FIG. 2c, and to consider functions $Z(\rho)$ different for some or all of them.

Figure 1:
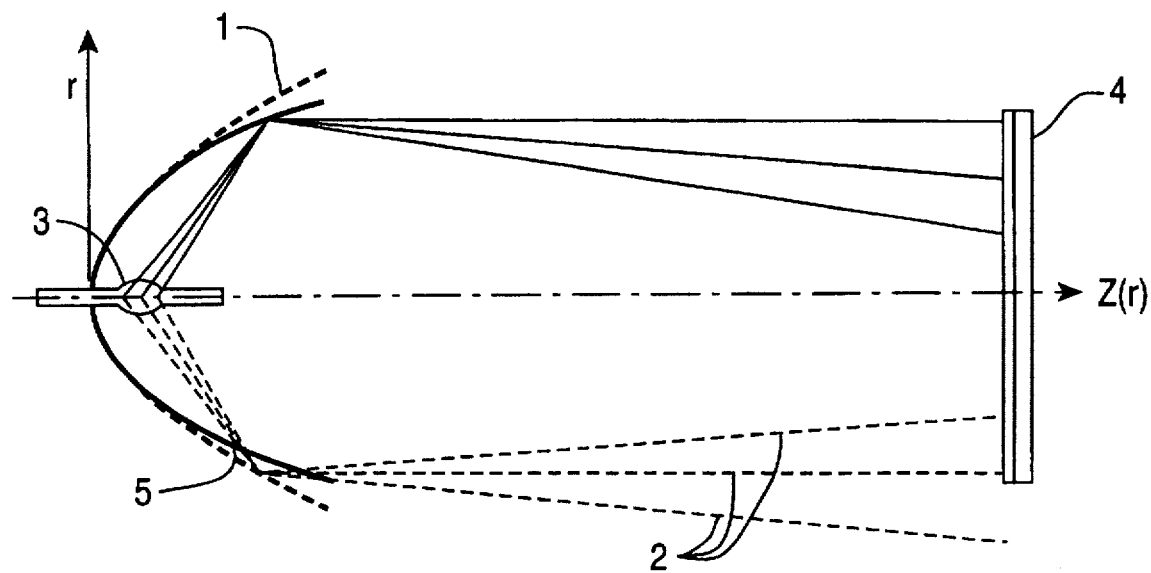
FIG. 1, already described, represents the superposition of the illuminations produced by a prior-art reflector and a reflector according to this invention.
Figure 3:
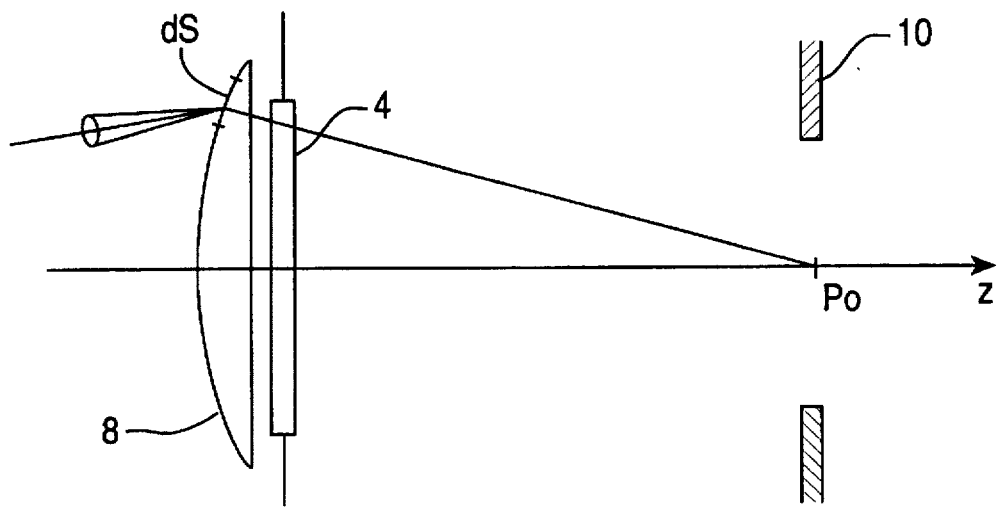
FIG. 3 illustrates a second application of this invention to a free form lens.

The principle described above can be applied to a free form lens by calculating the curvature for each point of the field lens 8, in such a way as to focus the mean incident ray at the center of the objective. In the same manner as previously described and represented in FIG. 3, in the first step, an elementary surface dS of the lens 8 is considered, and the inclination of each elementary surface dS of the lens is calculated so that the mean incident ray is focused at the center of the entry pupil of the projection objective 10. Likewise for the calculation of the reflector's shape, a set of functions $Z(\rho)$, is considered, each being given for a median plane $(\beta,Po)$ defined by the angle $\beta$ between each plane and the horizontal and Po, the center of the objective's pupil.

Each of the polynomials $a_2r^2 a_4r^4 + a_6r^6 + \ldots + a_nr^n$ can be calculated for each median plane $(\beta,Po)$, for example for β=0°, 15°, 30°, 45°, 60° and 90°. Then, in a second step, all the preceding polynomials are interpolated by a polynomial in (x,y) according to equation (2), for example.

An embodiment of an optimized lens has been made using the following parameters:

| | |
|---|---|
| Paraboioid: | focal length: 10 mm, |
| | diameter: 75 mm, |
| Lamp: | arc length: 5.0 mm, |
| | arc diameter: 1.5 mm, |
| | 16/9 format LCD screen size: 2.2"/48.7 × 27.4 mm$^2$, |
| | source - illumination plane distance: 320 mm, |
| | field lens - LCD distance: 5 mm, |
| | field lens - entrance pupil distance: 130 mm. |

Figure 5:
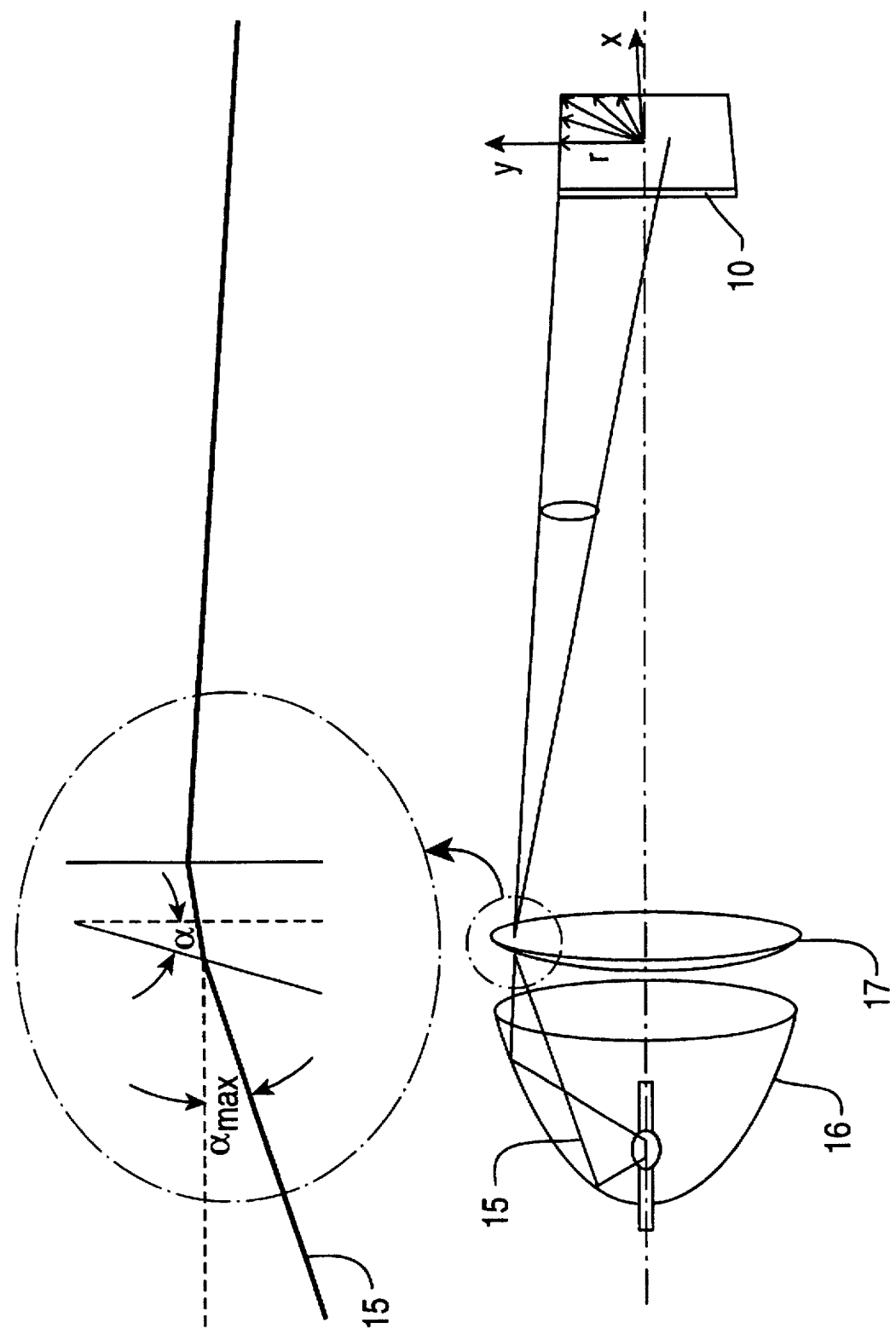
FIG. 5 represents a fourth application of this invention to a combination of any reflector and a free form illuminating lens.

Another application of this invention consists in using an illuminating (or condenser) lens constructed according to the principle of the invention combined with any type of parabolic reflector, for example parabolic, as illustrated in FIG. 5. The rays 15, after being reflected by the walls of reflector 16, are directed onto the lens 17 at an angle a to the horizontal. The elementary surface dS of the lens which the rays 15 are entering has an angle γ with respect to the vertical. The angle γ for each elementary surface dS of the field lens is calculated so that the set of average rays corresponding to the surface dS and the angle γ describes the border of the optical valve 10. The shape $Zr,\beta(p)$ of this lens is described by a set of elementary surfaces dS each of which is associated with a function $Z(\rho)$, each corresponding to a median plane $(r,\beta)$ to be illuminated. Each median plane is defined by the distance r between the center and the edge of the screen and the angle β between this median plane and the horizontal. The inclination of each of these elementary surfaces is obtained by interpolating these functions $Z(\rho)$ with a function $Z(x,y)$. A toric field lens, focusing the incident rays at the center of the objective's pupil, can also be added between this free form lens and the optical valve.

Figure 4:
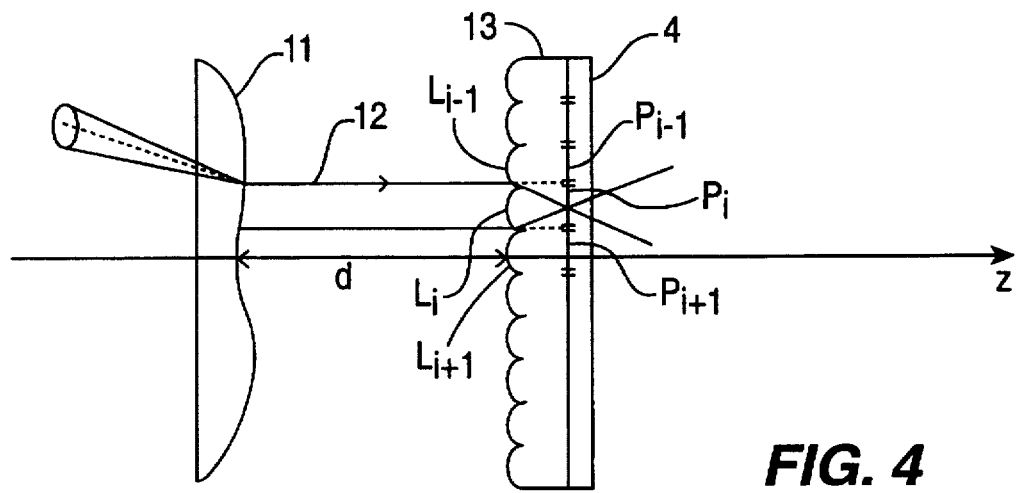
FIG. 4 represents a third application of this invention to an angle correction lens with a microlens network.

The principle according to the invention can also be applied to an angle correction lens. FIG. 4 illustrates an example of a projection system using such a lens 11. This lens has a free form, constructed according to the principle described above so that the outgoing beams 12 are parallel to the optical axis (o,z), and is coupled with a system of microlenses 13. One pixel Pi of the screen 4 corresponds to one microlens Li of the system 13. In this manner, each ray 12 can be focused at the center of each pixel Pi of the screen 4, as shown in the figure. By placing a field lens focusing in the projection objective's pupil (not shown in figure), the system's illumination is improved.

This invention can be applied to all types of optical systems using lenses and in particular to systems used to project video images onto a screen.

What is claimed is:

1. Reflector used to illuminate a surface, wherein the shape $Zr,\beta$ of the reflector is described by a set of elementary surfaces dS each of which is associated with a function $Z(\rho)$, corresponding to a median plane $(r,\beta)$ to be illuminated, defined by the distance r between the center and the edges of said surface and the angle β between the horizontal plane and this median plane, the inclination of each elementary surface dS being computed by interpolating said functions $Z(\rho)$ with a function $Z(x,y)$.

2. Reflector according to claim 1, wherein each of said functions $Z(\rho)$ is a conical equation added to a polynomial, or a pure polynomial.

3. Reflector according to claim 1, wherein said interpolation function $Z(x,y)$ is a polynomial.

4. Reflector according claim 1, wherein said distance r and said angle β define a rectangular surface.

5. Reflector according to claim 1, wherein said distance r and said angle β define a substantially round surface whose diameter lies between the major and minor dimensions of said surface.

6. Reflector according to claim 1, that is divided into several sections each defined by a radius about the optical axis, and whose shape is computed by interpolating functions $Z(\rho)$, each associated with one of said sections, with a function $Z(x,y)$.

7. Field lens, wherein the shape $Z\beta,Po$ of this field lens is described by a set of elementary surfaces dS each of which is associated with a function $Z(\rho)$, corresponding to a point Po to be illuminated of the optical axis (o,z), and an angle β between the horizontal plane and the median plane passing through Po, the inclination of the elementary surfaces dS being computed by interpolating said functions $Z(\rho)$ with a function $Z(x,y)$.

8. Angle correction lens, wherein the shape $Z\beta,\infty$ of this correction lens is described by a set of elementary surfaces dS each of which is associated with a function $Z(\rho)$, corresponding to a point P to be illuminated describing the surface of the lens at a distance d from the lens, and to the angle β between the horizontal plane and the median plane passing through the point P, the inclination of the elementary surfaces dS being computed by interpolating said functions $Z(\rho)$ with a function $Z(x,y)$.

9. Angle correction lens illuminated by any type of reflector, wherein the shape $(Zr,\beta)$ of this correction lens is described by a set of elementary surfaces dS each of which is associated with a function $Z(\rho)$, corresponding to the median plane $(r,\beta)$ to be illuminated, defined by the distance r from the center of the entry pupil and edges of the screen, and to the angle β between the horizontal plane and this median plane, the inclination of each of the elementary surfaces dS being computed by interpolating said functions $Z(\rho)$ with a function $Z(x,y)$.

10. Device for focusing light through a liquid crystal screen, that includes an angle correction lens whose shape $Z\beta,\infty$ is described by a set of elementary surfaces dS each of which is associated with a function $Z(\rho)$, corresponding to a point P to be illuminated describing the surface of the lens at a distance d from the lens, and to the angle β between the horizontal plane and the median plane passing through the point P, the inclination of the elementary surfaces dS being computed by interpolating said functions $Z(\rho)$ with a function $Z(x,y)$, said correction lens illuminating a perpendicular network of microlenses by horizontal beams, each microlens focusing at the center of a specific pixel of the screen.

11. System of projection through a liquid crystal screen, that includes an illumination device composed of a lamp and a reflector reflecting the light from the lamp toward the liquid crystal screen, wherein the reflector is a reflector whose shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface, and the angle β between the horizontal plane and this median plane, the inclination of each elementary surface dS being computed by interpolating said functions $Z(\rho)$ with a function $Z(x,y)$.

12. System of projection through a liquid crystal screen, that includes a reflector whose shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface and the angle β between the horizontal plane and this median plane, the inclination of each elementary surface dS being computed by interpolating said functions $Z(\rho)$ with a function $Z(x,y)$, and also includes a field lens whose shape $Z\beta.Po$ is described by a set of elementary surfaces dS each of which is associated with a function $Z(\rho)$, corresponding to a point Po to be illuminated of the optical axis (o,z), and an angle $\beta$ between the horizontal plane and the median plane passing through Po, the inclination of the elementary surfaces dS being computed by interpolating said functions $Z(\rho)$ with a function $Z(x,y)$.

13. System of projection through a liquid crystal screen, that includes a reflector whose shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface, and the angle $\beta$ between the horizontal plane and this median plane, the inclination of each elementary surface dS being computed by interpolating said functions $Z(\rho)$ with a function $Z(x,y)$, and also includes an angle correction lens whose shape $Z\beta,\infty$ is described by a set of elementary surfaces dS each of which is associated with a function $Z(\rho)$, corresponding to a point P to be illuminated describing the surface of the lens at a distance d from the lens, and to the angle $\beta$ between the horizontal plane and the median plane passing through the point P, the inclination of the elementary surfaces dS being computed by interpolating said functions $Z(\rho)$ with a function $Z(x,y)$.

14. System of projection through a liquid crystal screen, that includes a reflector whose shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface and the angle $\beta$ between the horizontal plane and this median plane, the inclination of each elementary surface dS being computed by interpolating said functions $Z(\rho)$ with a function $Z(x,y)$, and also includes a focusing device comprising an angle correction lens whose shape $Z\beta,\infty$ is described by a set of elementary surfaces dS each of which is associated with a function $Z(\rho)$, corresponding to a point P to be illuminated describing the surface of the lens at a distance d from the lens, and to the angle $\beta$ between the horizontal plane and the median plane passing through the point P, the inclination of the elementary surfaces dS being computed by interpolating said functions $Z(\rho)$ with a function $Z(x,y)$.

15. System of projection through a liquid crystal screen, that includes a reflector whose shape $Zr,\beta$ is described by a set of elementary surfaces dS each of which is associated with a function $Z(\rho)$, corresponding to a median plane $(r,\beta)$ to be illuminated, defined by the distance r between the center and the edges of said surface and the angle $\beta$ between the horizontal plane and this median plane, the inclination of each elementary surface dS being computed by interpolating said functions $Z(\rho)$ with a function $Z(x,y)$, and also includes a field lens whose shape $Z\beta.Po$ is described by a set of elementary surfaces dS each of which is associated with a function $Z(\rho)$, corresponding to a point Po to be illuminated of the optical axis (o,z), and an angle $\beta$ between the horizontal plane and the median plane passing through Po, the inclination of the elementary surfaces dS being computed by interpolating said functions $Z(\rho)$ with a function $Z(x,y)$, and also includes a focusing device comprising an angle correction lens whose shape $Z\beta,\infty$ is described by a set of elementary surfaces dS each of which is associated with a function $Z(\rho)$, corresponding to a point P to be illuminated describing the surface of the lens at a distance d from the lens, and to the angle $\beta$ between the horizontal plane and the median plane passing through the point P, the inclination of the elementary surfaces dS being computed by interpolating said functions $Z(\rho)$ with a function $Z(x,y)$.

* * * * *